United States Patent [19]

Aubert

[11] 4,077,840
[45] Mar. 7, 1978

[54] NUCLEAR REACTOR WITH LOCKING-KEY SAFETY MECHANISM

[75] Inventor: Roger Aubert, Orsay, France

[73] Assignee: Commissariat a l'Energie Atomique, Paris, France

[21] Appl. No.: 734,168

[22] Filed: Oct. 20, 1976

[30] Foreign Application Priority Data

Oct. 28, 1975 France .................................. 75 32940

[51] Int. Cl.² ............................................. G21C 11/00
[52] U.S. Cl. ...................................... 176/87; 220/323; 70/441
[58] Field of Search .................. 176/87; 220/316, 323, 220/327, 8, DIG. 20; 70/432, 441; 292/144, 150

[56] References Cited

U.S. PATENT DOCUMENTS

| 3,437,230 | 4/1969 | Savory | 220/327 |
| 3,514,115 | 5/1970 | Gallo | 176/87 X |
| 3,533,530 | 10/1970 | Gallo et al. | 176/87 |
| 3,578,564 | 5/1971 | Fletcher | 176/87 |
| 3,926,722 | 12/1975 | Dupen | 176/87 |
| 3,936,083 | 2/1976 | Bright | 292/150 X |

FOREIGN PATENT DOCUMENTS

977,537   12/1964   United Kingdom ................. 176/87

*Primary Examiner*—Peter A. Nelson
*Attorney, Agent, or Firm*—Sughrue, Rothwell, Mion, Zinn and Macpeak

[57] ABSTRACT

A device for coupling a pressure vessel closure cap to an upper structure for supporting the reactor internals comprises a plurality of locking-keys which are guided in translational motion within radially disposed housings and can be moved into outwardly projecting positions by externally-controlled actuating means in order to engage in opposite recesses formed in the internal wall of the closure cap.

7 Claims, 7 Drawing Figures

NUCLEAR REACTOR WITH LOCKING-KEY SAFETY MECHANISM

This invention relates to a nuclear reactor which embodies special and novel arrangements for securing the reactor vessel closure cap to the upper internal structure which is located within said vessel above the reactor core.

The novel and characteristic arrangements of this patent are intended to permit simultaneous withdrawal of said vessel cap and said structure in order to reach the reactor core rapidly and to reduce the time required for preliminary operations involved in the refuelling of a nuclear reactor.

It is known that, prior to the present invention, the vessel cap was coupled with the upper internal structure of a nuclear reactor by securing said structure to said vessel cap by means of tie-bolts.

A coupling system of this type is subject to many disadvantages, however, since sealing systems have to be fitted in position at the level of the vessel cap penetrations and control of the coupling operation gives rise to practical difficulties. Moreover, when the structure has to be detached from the vessel cap, the operations required take a considerable length of time.

This invention is precisely directed to a nuclear reactor in which novel arrangements are provided for overcoming the disadvantages mentioned in the foregoing.

The reactor under consideration essentially comprises a pressure vessel closed by a cap and within said vessel a core constituted by fuel assemblies and surmounted by an upper structure for supporting the reactor internals, said structure being in turn supported by said vessel. The reactor is further distinguished by the fact that it comprises a device which serves to couple the vessel closure cap with said upper structure and comprises:

- a plurality of locking-keys each guided in translational motion within a housing which is integral with the upper portion of said structure, said housings being disposed radially in spaced relation above the plane of coupling of the closure cap with the pressure vessel and said locking-keys being capable of projecting outwards from their housings in order to engage in a recess formed in the internal wall of the closure cap opposite to said housing;

- a plurality of assemblies of means which are controlled from the exterior of the reactor and each serve to place a locking-key either in a withdrawn position or in a projecting position.

While being both simple and reliable, the reactor-vessel coupling device defined in the foregoing provides a noteworthy advantage in that pressure-tightness of the vessel is maintained since the pressure-tight passages to be provided within the closure cap for controlling the assemblies of means which are each intended to place a locking-key in position can be of small size and very limited in number for a judicious choice of said assemblies. Said device has a further advantage in that it permits easy control of the coupling operation and also provides the possibility of rapid uncoupling whenever this proves necessary.

Different embodiments of the coupling device which have their own characteristic advantages in each case may be contemplated in accordance with the present invention.

A certain number of these embodiments relate in the first place to assemblies of means which are each capable of placing a locking-key either in the outwardly-projecting position or in the withdrawn position.

In accordance with a first embodiment, each assembly aforesaid comprises a mechanical system which is adapted to place the locking-key in the withdrawn or projecting position by converting the movement of rotation of a shaft which passes through said closure cap in pressure-tight manner into a movement of translation imparted to said locking-key, said mechanical system being designed for example in the form of a worm-rack system in which the toothed rack is integral with the locking-key.

In accordance with another embodiment, each assembly aforesaid comprises on the one hand a mechanical system as defined in accordance with the preceding embodiment and on the other hand a spring which is capable of automatically placing the locking-key in the projecting position once the closure cap has been secured to the pressure vessel.

The vessel cap can thus automatically be coupled to the structure once said cap has been placed on the pressure vessel whereas uncoupling can nevertheless be obtained at any moment by actuating said mechanical system.

It is also possible to perfect the coupling by means of the mechanical system when the force applied by the spring proves to be insufficient.

Moreover, in the case of the above-mentioned embodiment of the device according to the invention, it is particularly advantageous to ensure that the projecting end of a locking-key has a bevelled face in order to ensure that withdrawal of the key takes place in spite of the spring as a result of the pressure exerted by the closure cap when this latter is moved into position on the pressure vessel.

In accordance with a further embodiment, each assembly aforesaid comprises a hydraulic system which is capable of placing the locking-key in the withdrawn or projecting position, said hydraulic system being designed for example in the form of a double-acting jack having an operating rod which is rigidly fixed to said locking-key.

It can be noted that, in the aforementioned embodiment which calls for the use of hydraulic systems such as double-acting jacks, only two pressure-tight passages need be provided for the purpose of respectively supplying the complete set of jacks both for the coupling operation and for the uncoupling operation.

In accordance with another embodiment, each assembly aforesaid comprises on the one hand a hydraulic system as defined in the preceding embodiment and on the other hand a spring which is capable of automatically placing the locking-key in the projecting position once said closure cap has been secured to the pressure vessel.

In accordance with this embodiment, it is also preferable to ensure that the end of the projecting locking-key has a bevelled face.

In this embodiment also, the closure cap and the structure can be automatically coupled together when the cap is placed on the pressure vessel. If full coupling can be automatically obtained by means of the spring in accordance with this embodiment, then it may be noted that the use of a double-acting jack is no longer essential but remains preferable in the event of difficult displacement of the locking-key under the action of the spring.

Further means of construction of the device in accordance with the invention make it possible in the second place to maintain coupling and/or uncoupling as well as to ensure control of these latter.

Thus in accordance with a preferential embodiment of the device in accordance with the invention, said device further comprises a plurality of means which are capable of maintaining the position of outward projection and/or the position of withdrawal of said locking-keys.

Each of the means aforesaid can for example be constituted by a safety locking-pin whose lower end is capable of engaging in a recess formed in the top wall of the locking-key once said key has been placed in the position of withdrawal or projection, said locking-pin being guided by a hollow cylindrical element which extends through the vessel closure cap and opens into the housing of the locking-key.

Each of the means aforesaid can also be constituted by a hydraulic system consisting for example of a jack rigidly fixed to a rod which is capable of engaging in a recess formed in the top wall of the locking-key once said key has been placed in a projecting or withdrawn position.

In another preferential embodiment of the invention, the device further comprises means which are each capable of checking the position of a locking-key.

Each of the means aforesaid can consist for example of a gauge which can be inserted into recesses formed in the top wall of a locking-key, said recesses being of variable depth according to their position in said wall and said gauge being guided by a hollow cylindrical element which extends through the vessel closure cap.

A more complete understanding of the invention will in any case be obtained from the following description in which a number of different examples of construction of the coupling device according to the invention are given by way of illustration but not in any limiting sense, reference being made to the accompanying drawings, in which:

FIG. 1 shows the upper portion of the pressure vessel 1 of a nuclear reactor of the so-called pressurized-water type, said pressure vessel being closed by a cap 3.

Figure 1:
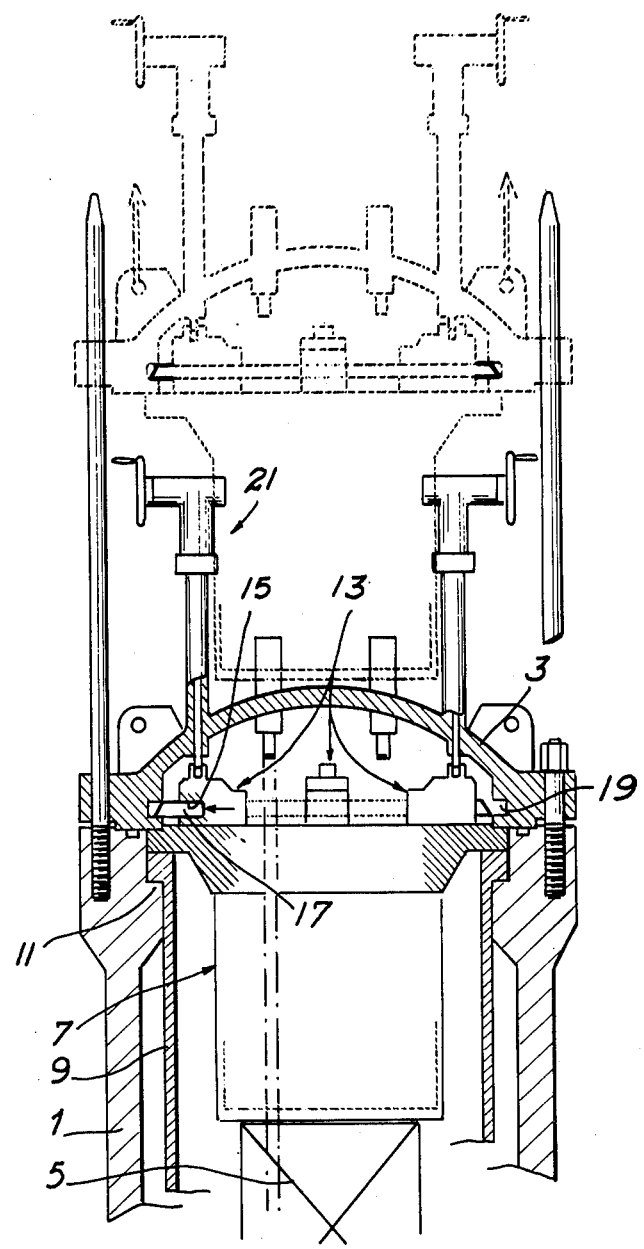
FIG. 1 is a vertical sectional view of the upper portion of the pressure vessel of a nuclear reactor of the pressurized water type in which the device according to the invention is employed.

Within the interior of said pressure vessel, there is shown diagrammatically above the reactor core 5 the upper structure 7 which constitutes a support for the reactor internals and through which the reactor control rods are capable of vertical motion, said control rods being represented schematically in chain-dotted lines in the figure.

In principle, said structure is carried by the shell 9 of the reactor core 5 which rests on an annular flange 11 of the pressure vessel 1. Four support units 13 are arranged at uniform intervals at the top portion of said structure 7 and are rigidly fixed to this latter. Housings 15 formed within said support units each serve to guide a locking-key 17 in a movement of translation along a radial axis.

In accordance with the essential feature of the invention, one end of a locking-key 17 is capable of engaging within a locking recess 19 formed opposite to said housing 15, said locking recess being formed in the internal wall of the reactor vessel closure cap 3.

A device for controlling the motion of a locking-key 17 (not shown in this figure) is mounted within the interior of a support unit 13, said device being intended to be actuated above the closure cap by means of a suitable drive system 21.

Figure 2:
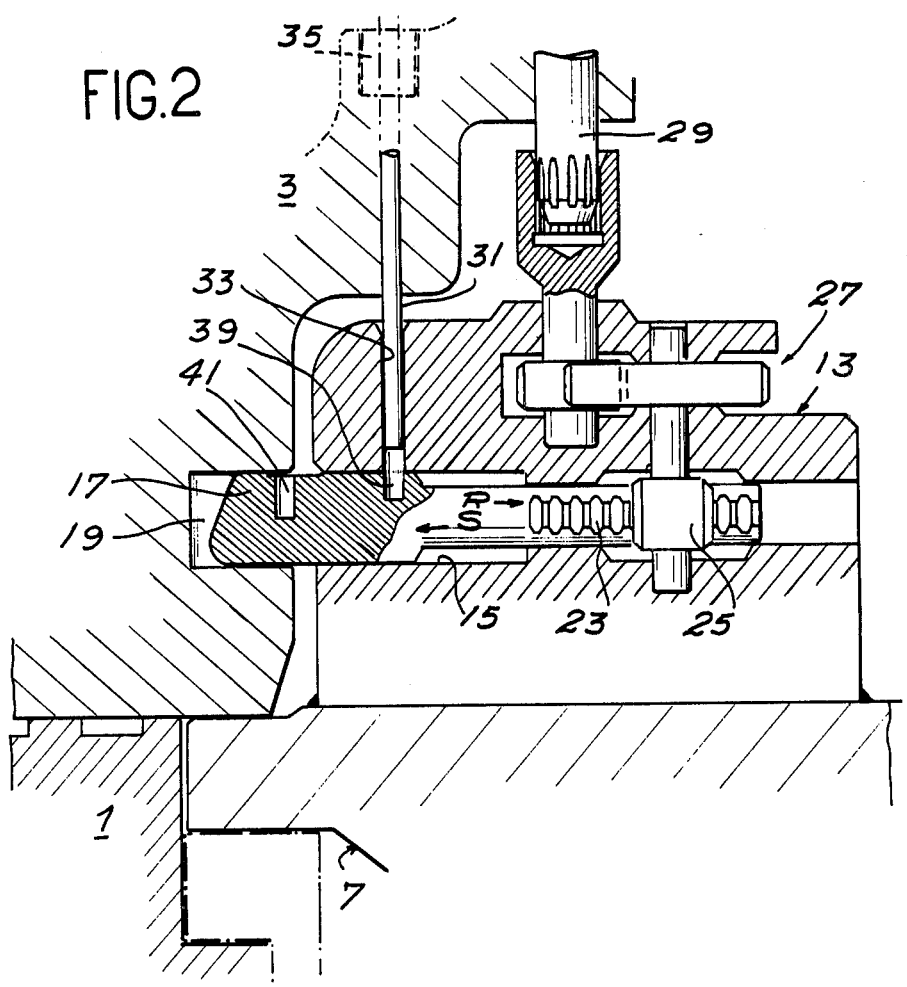
FIG. 2 is a vertical sectional view of an alternative embodiment of the device according to the invention in which the means employed for placing a locking-key in the projecting and withdrawn position are worm-rack systems.

FIG. 2 shows one of the units consisting of the association of a locking-key and positioning device which constitutes the device according to the invention in accordance with a first embodiment. In this figure, it is apparent that the locking-key 17 is integral with a toothed rack 23 coupled to a worm 25, said worm being driven in rotation by the gear-train 27 for reducing and transmitting motion of the splined shaft 29 which passes through the top portion of the closure cap 3. There has also been shown in this figure a safety locking-pin 31 guided by a hollow cylindrical element 33 which passes through the closure cap 3, said element 33 being sealed-off by means of a plug 35. As shown in the figure, said safety locking-pin 31 penetrates into the housing 15 in order that the lower end of this latter may be permitted to engage within a recess 39 formed in the top wall of the locking-key 17, with the result that said recess 39 is located in the line of extension of said cylindrical element 33 when the locking-key is in the outwardly-projecting position.

The operation of the device follows from the general design concept of this latter. A movement of rotation of the shaft 29 causes the displacement of the locking-key 17 either towards a position of withdrawal (arrow R) or towards a position of outward projection (arrow S), depending on the direction of rotation of said shaft. From this it follows that the closure cap 3 is rigidly fixed to the structure 7 after said cap has been placed in position on the pressure vessel, when the locking-key 17 has been inserted to the maximum extent within the recess 19 of the internal wall of the cap 3 and that said cap is detached from said structure when the locking-key 17 is fully withdrawn into the interior of its housing 15.

Furthermore, by introducing the lower end of the safety locking-pin into the recess 39 of the locking-key 17, said key is accordingly maintained in the outwardly projecting position.

Figure 3:
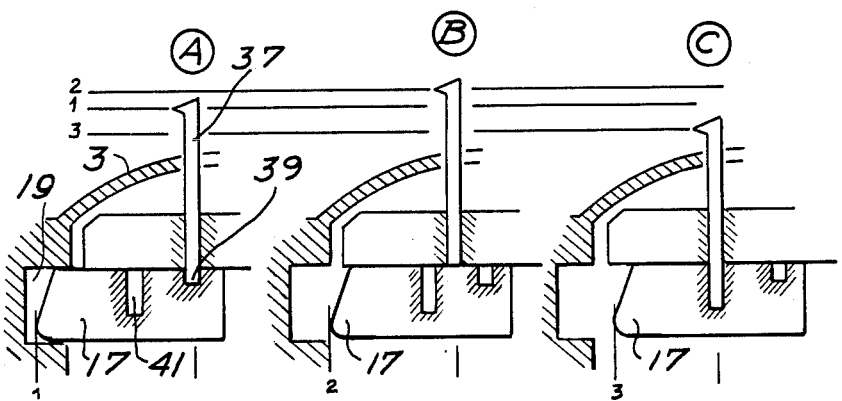
FIG. 3 illustrates the design of a gauge which serves to check the position of a locking-key.

The principle involved in checking the position of a locking-key is shown diagrammatically in FIG. 3.

A gauge 37 is introduced into the cylindrical recess 39 shown in FIG. 2.

By virtue of the presence of the recesses 39 and 41 of different depth which are cut in the top wall of the locking-key 17 at locations such that, in position A of FIG. 3, said gauge 37 is capable of engaging within the recess 39 when the locking-key 17 is in the outwardly-projecting position and that, in position C of FIG. 3, said gauge 37 is capable of engaging within the recess 41 when the locking-key 17 is in the withdrawn position, it is possible to determine the positions of the locking-key as a function of the degrees of penetration of said gauge 37 into the housing 15 of the locking-key. On the other hand, the portion B of FIG. 3 shows that, when the gauge does not engage within any recess, the fact that only partial coupling or uncoupling has taken place can accordingly be detected.

Figure 4:
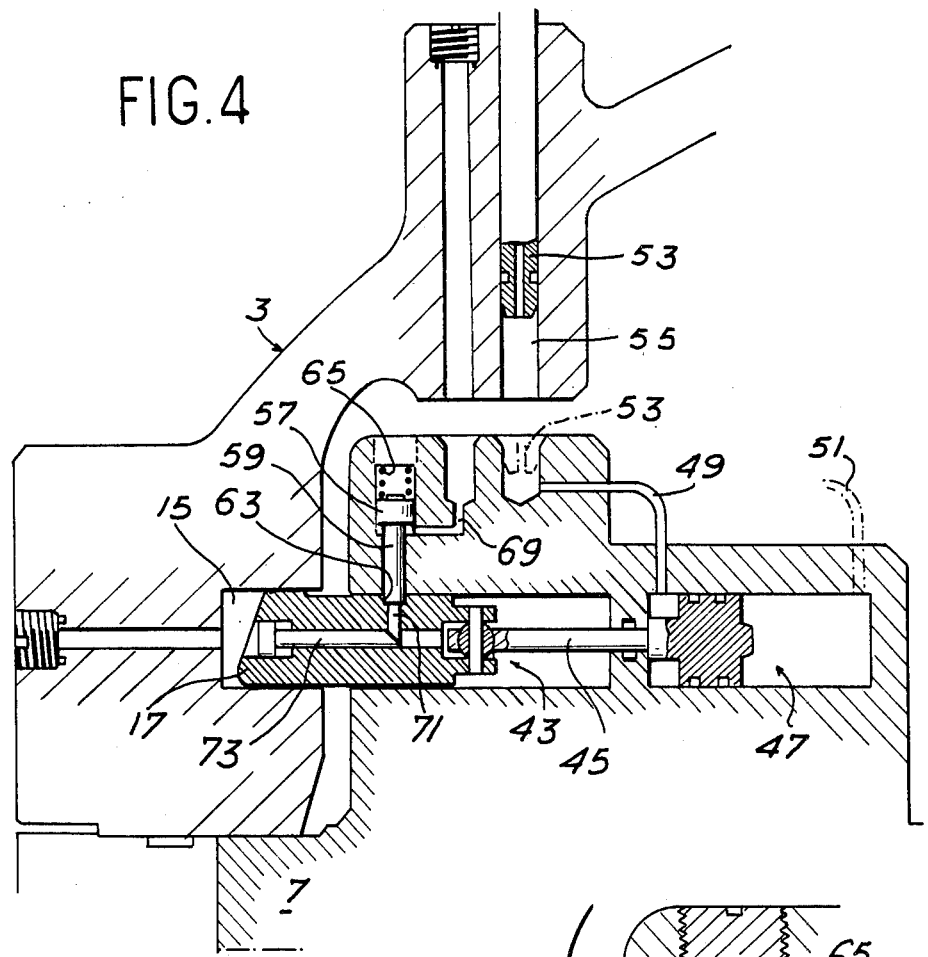
FIG. 4 illustrates an alternative embodiment of the device in which the means for positioning a locking-key are constituted by double-acting jacks and the means for maintaining the position of a locking-key are constituted by hydraulic systems.

FIG. 4 shows the embodiment of the device according to the invention in which the assemblies for positioning the locking-keys are constituted by hydraulic systems.

In this figure, it is apparent that the locking-key 17 is connected by means of a universal-joint assembly 43 to the operating rod 45 of a double-acting jack 47 supplied with fluid by means of pipes 49 and 51 which are integrated in a circuit for supplying all the jacks of the device according to the invention which are similar to the jack 47 from two control tubes as designated by the reference 53, each tube being placed within a passage 55 formed in the vessel closure cap 3.

There is also shown in this figure a second jack 57 which is integral with an operating rod 59. When the locking-key 17 is in the outwardly projecting position, said operating rod is capable of engaging within a recess 63 formed at a suitable point of the top wall of said locking-key 17. It is seen that a spring 65 is placed above the piston of the jack 57 in order to ensure that said operating rod 59 engages automatically once the locking-key has been placed in the outwardly projecting position.

The jack 57 is supplied through the duct 69 so as to permit withdrawal of the operating rod 59 from the recess 63 when unlocking is necessary.

There is also shown diagrammatically in FIG. 4 the assembly which makes it possible to release the operating rod 59 in the event of a fault condition.

Figure 5:
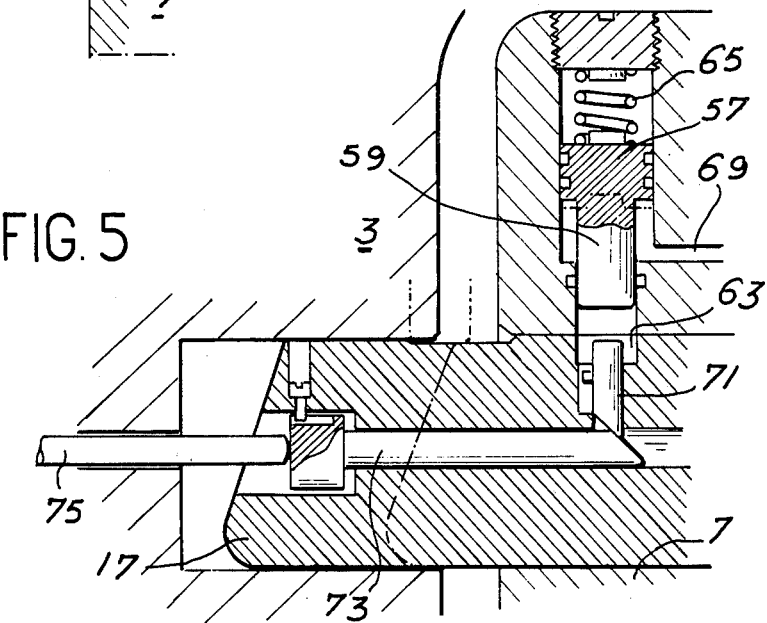
FIG. 5 illustrates the design of a safety system for releasing a locking-key.

As can be seen more precisely in FIG. 5, the above-mentioned assembly comprises on the one hand a wedge 71 which is capable of vertical displacement within the interior of the locking-key 17 between a position in which the upper end of the wedge does not penetrate into said recess 63 and another position in which the upper end contained within said recess 63 just reaches the level of the top portion of the locking-key 17 and on the other hand a wedge-driving rod 73 which is capable of moving horizontally within the interior of the locking-key 17 when displaced by a rod 75 which is located in the line of extension of said wedge-driving rod 73.

With reference to FIG. 4 and FIG. 5 in which the above-described assembly is shown respectively in each of its end positions, it can be seen that when the operating rod 59 is locked in position within the recess 63, it is possible by causing the upward displacement of the wedge 71 to apply a sufficient force to the base of said rod 59 to ensure that this latter rises above the housing 15 in order to permit withdrawal of the locking-key 17.

Figure 6:
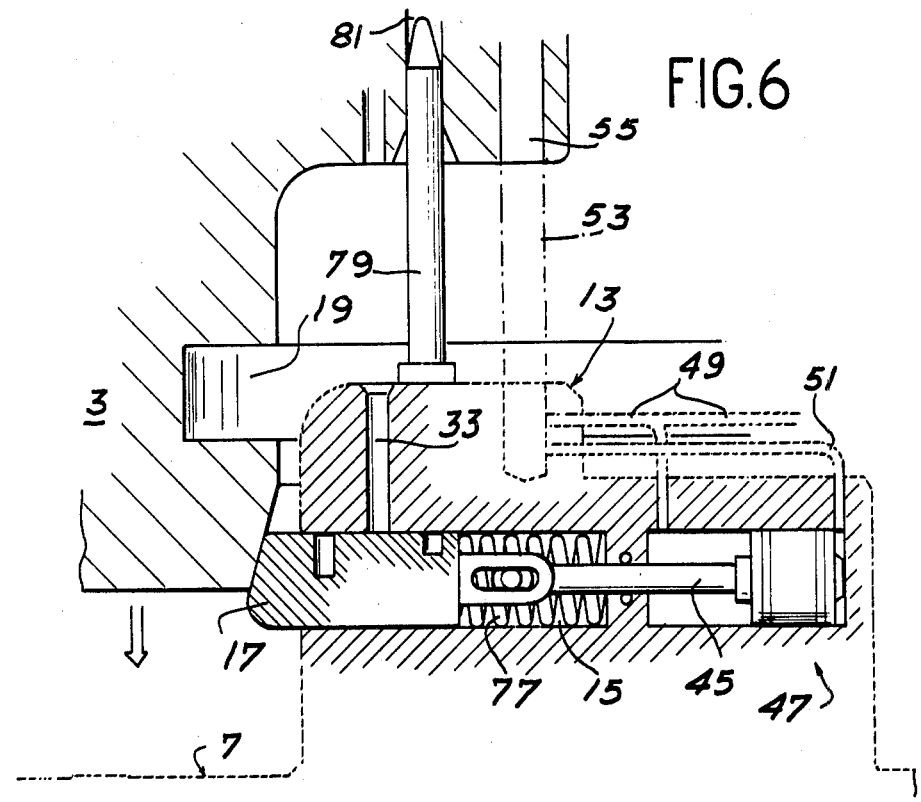
FIG. 6 illustrates an alternative embodiment in which the assemblies of means for positioning a locking-key comprise on the one hand a jack and on the other hand a spring.

In FIG. 6, in which the elements already shown in one of the previous figures are designated by the same reference numerals, it is apparent in the first place that the assembly for positioning a locking-key comprises on the one hand a double-acting jack 47 whose mode of action is similar to that of the jack employed in the embodiment represented diagrammatically in FIG. 4 and on the other hand a spring 77 which is placed in the bottom of the housing 15, the force applied by the spring on the locking-key 17 being such as to cause this latter to be placed in the outwardly projecting position.

In the second place, the presence of a hollow cylindrical element 33 is observed in the support unit 13 which is carried by the structure 7. There can be inserted into said hollow cylindrical element either a safety locking-pin 31 or a gauge 37, these components being identical with those shown in FIGS. 2 and 3.

It is noted from FIG. 6 that the projecting end of the locking-key 17 has a bevelled face and that the support unit 13 carries a guide pin 79 which is capable of penetrating into a cylindrical bore 81 formed in the closure cap 3.

From a study of FIG. 6, it is possible to gain a clear understanding of the sequence of operations to be performed in order to place the vessel closure cap 3 in position and to secure the structure 7 to said cap 3. This sequence of operations takes place as follows:

the vessel cap 3 is lowered onto the structure 7 until this latter is centered on the guide pins such as the pin 79;

the control tubes 53 for the supply of jacks such as the jack 47 are placed within passages such as those designated by the reference 55 which are accordingly open at the upper ends thereof;

the jacks 47 are supplied so as to permit withdrawal of the locking-keys 17;

the withdrawal operation is checked by introducing a gauge 37 into the hollow cylindrical element 33;

the vessel cap 3 is lowered to its end position;

the supply to the jacks 47 is cut off;

it is ascertained that automatic coupling by means of the spring 77 has been correctly performed;

the locking-key 17 is secured in the outwardly projecting position by introducing a safety locking-pin 31 into the hollow element 33;

said element 33 and the passages 55 are sealed-off.

It is worthy of note that the particular shape of the projecting end of the locking-key 17 facilitates withdrawal of this latter in spite of the presence of the spring 77. The movement of withdrawal can be contemplated without making use of jacks 47 and in that case takes place simply by means of the force applied by the vessel cap at the time of positioning of this latter.

It is also observed that, by virtue of the spring 77, the supply of the jacks 47 for placing the locking-keys 17 in the outwardly projecting position is not necessary.

Figure 7:
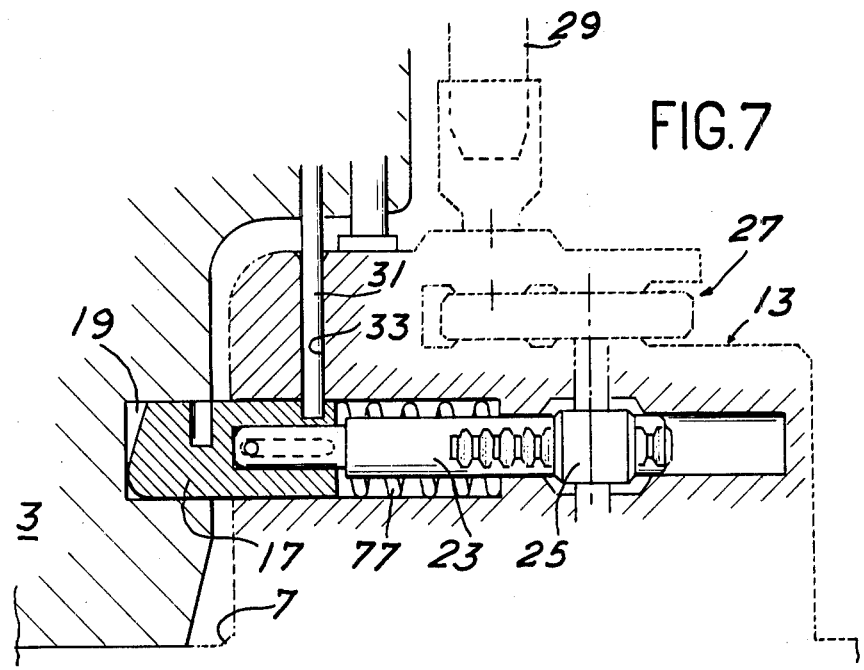
FIG. 7 illustrates an alternative embodiment in which the assemblies of positioning means comprise on the one hand a worm-rack system and on the other hand a spring.

There is shown in FIG. 7 an embodiment of the device according to the invention in which a spring 77 is associated with each of the worm-rack assemblies such as those employed in the embodiment illustrated in FIG. 1.

The performance of the operations for positioning of the vessel cap 3 and coupling of the structure 7 to said cap 3 is similar to that described with reference to FIG. 6, the uncoupling operation being then effected by rotation of the splined shaft 29.

What we claim is:

1. A nuclear reactor comprising a pressure vessel having a cap, means for securing said cap on said pressure vessel, core means including fuel assemblies and control elements disposed within said vessel, a supporting structure supported by said vessel above said core means for supporting said elements in the reactor and coupling means for coupling said cap with said supporting structure, said coupling means comprising a plurality of housing means mounted on said supporting structure above the line of engagement between said cap and said vessel, a plurality of recesses formed in said closure cap opposite each housing means, a locking key slidably disposed in each housing means for movement between a first position in engagement with said recesses and said housing means and a second position out of engagement with said recesses and actuating means for each locking key operable from the exterior of said reactor, said actuating means for each locking key comprising a rotatable shaft extending outwardly through said cap in pressure tight relation and gear means coupling each shaft with each locking key so that upon rotation of said shafts in opposite directions said locking keys will be moved into and out of engagement with said recesses.

2. A nuclear reactor as set forth in claim 1 wherein each locking key is provided with a beveled end portion, lost motion means connecting said beveled end portion to said locking key and spring means for biasing said beveled end portion outwardly of said housing means toward said cap whereby upon lowering of said cap toward engagement with said vessel said beveled end portion will be moved into said housing means against said spring means and when said cap is disposed in engagement with said vessel said spring means will move said beveled end portion outwardly into engagement with the respective recess.

3. A nuclear reactor as set forth in claim 1 further comprising locking means for selectively securing said locking key in said first and second positions.

4. A nuclear reactor as set forth in claim 3 wherein said locking means is comprised of a pair of spaced apart recesses formed in each locking key and a locking pin associated with each locking key slidably movable into and out of engagement with one of said spaced apart recesses depending upon the position of said locking key.

5. A nuclear reactor as set forth in claim 4 further comprising hydraulic means for moving said locking pins into and out of engagement with said recesses in said locking keys.

6. A nuclear reactor as set forth in claim 1 further comprising a plurality of indicating means for checking the position of each locking key.

7. A nuclear reactor as set forth in claim 6 wherein each of said indicating means is comprised of a gage engageable within recesses formed in each locking key, the depth of said recesses being a function of their position in said locking key, said gage being slidably mounted in a passage extending through said cap.

* * * * *